United States Patent
Glading et al.

(10) Patent No.: US 9,875,373 B2
(45) Date of Patent: Jan. 23, 2018

(54) PRIORITIZATION OF USERS DURING DISASTER RECOVERY

(71) Applicant: International Business Machines Corporation, Armonk, NY (US)

(72) Inventors: Ian A.J. Glading, Hampshire (GB); Sachin K. Mahajan, Pune (IN); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/867,323

(22) Filed: Sep. 28, 2015

(65) Prior Publication Data

US 2017/0091472 A1    Mar. 30, 2017

(51) Int. Cl.
G06F 17/00 (2006.01)
G06F 21/62 (2013.01)
G06F 9/445 (2006.01)
G06F 11/07 (2006.01)
G06F 21/31 (2013.01)
G06F 21/34 (2013.01)
H04L 29/06 (2006.01)
H04L 29/14 (2006.01)

(52) U.S. Cl.
CPC ............ *G06F 21/6218* (2013.01); *G06F 8/65* (2013.01); *G06F 11/079* (2013.01); *G06F 11/0751* (2013.01); *G06F 11/0793* (2013.01); *G06F 21/31* (2013.01); *G06F 21/34* (2013.01); *H04L 63/105* (2013.01); *H04L 69/40* (2013.01)

(58) Field of Classification Search
CPC ............ G06F 21/6218; G06F 11/0751; G06F 11/079; G06F 8/65
See application file for complete search history.

(56) References Cited

U.S. PATENT DOCUMENTS

| | | | |
|---|---|---|---|
| 6,750,883 B1 * | 6/2004 | Parupudi | G06F 21/6227 715/762 |
| 6,978,379 B1 * | 12/2005 | Goh | G06F 21/604 713/1 |
| 7,558,982 B2 | 7/2009 | Blohm | |
| 7,904,748 B2 * | 3/2011 | Witte | G06F 11/1435 714/6.12 |

(Continued)

FOREIGN PATENT DOCUMENTS

EP    2171593 B1    1/2014

OTHER PUBLICATIONS

Mell, Peter et al.; "The NIST Definition of Cloud Computing"; Recommendations of the National Institute of Standards and Technology; NIST National Institute of Standards and Technology; US Department of Commerce; Special Publication 800-145; Sep. 2011; pp. 7.

*Primary Examiner* — Techane Gergiso
(74) *Attorney, Agent, or Firm* — Alexander G. Jochym

(57) ABSTRACT

Two or more users of a system are determined. The system includes at least one resource. Contextual information for a user of the two or more users is determined. The user of the two or more users are assigned to a tier of a plurality of tiers based on the contextual information. A failure of a system is determined. Responsive to determining the system has a system failure, a user of the two or more users is granted access to the system based on the tier assigned to the user.

20 Claims, 5 Drawing Sheets

(56) References Cited

U.S. PATENT DOCUMENTS

| | | | | |
|---|---|---|---|---|
| 8,214,687 | B2* | 7/2012 | Colaiacomo | G06F 11/1438 714/10 |
| 8,260,747 | B2 | 9/2012 | Wu et al. | |
| 8,862,554 | B2 | 10/2014 | Deshmukh et al. | |
| 9,009,289 | B1* | 4/2015 | Jacob | G06Q 30/0206 370/216 |
| 9,349,016 | B1* | 5/2016 | Brisebois | H04L 63/20 |
| 9,426,182 | B1* | 8/2016 | Zeljko | H04L 63/20 |
| 9,467,476 | B1* | 10/2016 | Shieh | H04L 63/20 |
| 2002/0073320 | A1* | 6/2002 | Rinkevich | G06F 21/31 713/183 |
| 2002/0173295 | A1* | 11/2002 | Nykanen | H04L 67/18 455/414.1 |
| 2002/0184217 | A1* | 12/2002 | Bisbee | G06F 21/33 |
| 2003/0005117 | A1* | 1/2003 | Kang | H04L 63/10 709/225 |
| 2004/0083394 | A1* | 4/2004 | Brebner | G06F 21/31 726/19 |
| 2004/0162997 | A1* | 8/2004 | Hopmann | G06F 21/6218 713/154 |
| 2004/0250125 | A1* | 12/2004 | Janson | G06F 21/121 726/22 |
| 2005/0091655 | A1* | 4/2005 | Probert | G06F 8/62 719/315 |
| 2005/0278792 | A1* | 12/2005 | Ramani | H04L 63/104 726/27 |
| 2007/0050850 | A1* | 3/2007 | Katoh | G06F 21/31 726/27 |
| 2007/0094501 | A1* | 4/2007 | Takamizawa | G06F 21/32 713/170 |
| 2008/0155649 | A1* | 6/2008 | Maler | H04L 63/20 726/1 |
| 2009/0007262 | A1* | 1/2009 | Wallace | G06F 21/6218 726/21 |
| 2009/0115600 | A1* | 5/2009 | Lee | H04L 63/10 340/539.11 |
| 2009/0210427 | A1* | 8/2009 | Eidler | G06F 11/1484 |
| 2009/0228963 | A1* | 9/2009 | Pearce | H04L 63/0815 726/5 |
| 2009/0327327 | A1* | 12/2009 | Sathish | H04L 63/102 |
| 2010/0115332 | A1* | 5/2010 | Zheng | G06F 11/1461 714/6.2 |
| 2010/0287597 | A1* | 11/2010 | Richins | G06F 21/604 726/1 |
| 2011/0055890 | A1* | 3/2011 | Gaulin | G06F 21/6218 726/1 |
| 2011/0138452 | A1* | 6/2011 | Dooley | H04L 63/20 726/8 |
| 2011/0239270 | A1* | 9/2011 | Sovio | G06F 21/6236 726/1 |
| 2011/0246777 | A1* | 10/2011 | Buckley | H04L 9/0844 713/172 |
| 2011/0296487 | A1* | 12/2011 | Walsh | G06F 21/10 726/1 |
| 2011/0314549 | A1* | 12/2011 | Song | G06F 21/31 726/25 |
| 2012/0011559 | A1* | 1/2012 | Miettinen | G06F 21/31 726/1 |
| 2012/0216244 | A1* | 8/2012 | Kumar | G06F 21/57 726/1 |
| 2012/0233314 | A1* | 9/2012 | Jakobsson | G06Q 30/0225 709/224 |
| 2013/0054822 | A1 | 2/2013 | Mordani et al. | |
| 2013/0080823 | A1 | 3/2013 | Roth et al. | |
| 2013/0104187 | A1* | 4/2013 | Weidner | G06F 21/31 726/1 |
| 2013/0166520 | A1* | 6/2013 | Vass | H04N 21/2387 707/694 |
| 2013/0174239 | A1* | 7/2013 | Kim | G06F 21/31 726/7 |
| 2013/0185667 | A1* | 7/2013 | Harper | G06F 11/0709 715/772 |
| 2013/0219510 | A1* | 8/2013 | Seleznev | G06F 21/10 726/27 |
| 2013/0227704 | A1* | 8/2013 | Boivie | G06F 21/31 726/27 |
| 2013/0254831 | A1* | 9/2013 | Roach | H04L 63/107 726/1 |
| 2014/0040206 | A1* | 2/2014 | Ramakrishnan | G06F 11/2097 707/640 |
| 2014/0053241 | A1* | 2/2014 | Norrman | H04L 63/08 726/3 |
| 2014/0059662 | A1* | 2/2014 | Zhu | H04L 9/3271 726/6 |
| 2014/0143149 | A1* | 5/2014 | Aissi | G06F 21/31 705/44 |
| 2014/0201814 | A1* | 7/2014 | Barkie | H04L 63/107 726/4 |
| 2014/0230077 | A1* | 8/2014 | Muff | G06F 9/45533 726/30 |
| 2014/0259130 | A1* | 9/2014 | Li | G06F 21/31 726/6 |
| 2014/0283131 | A1* | 9/2014 | Rozenberg | G06F 21/6209 726/28 |
| 2014/0302841 | A1* | 10/2014 | Krco | H04W 8/18 455/419 |
| 2014/0304824 | A1* | 10/2014 | Sirohi | G06F 21/6227 726/26 |
| 2015/0020191 | A1* | 1/2015 | Vida | G06F 21/32 726/17 |
| 2015/0033305 | A1* | 1/2015 | Shear | G06F 21/45 726/6 |
| 2015/0039930 | A1 | 2/2015 | Babashetty et al. | |
| 2015/0081640 | A1* | 3/2015 | Long | G06F 11/1451 707/646 |
| 2015/0106888 | A1* | 4/2015 | Cheng | G06F 21/62 726/5 |
| 2015/0128205 | A1* | 5/2015 | Mahaffey | H04L 63/20 726/1 |
| 2015/0134723 | A1 | 5/2015 | Kansai et al. | |
| 2015/0135258 | A1* | 5/2015 | Smith | G06F 21/45 726/1 |
| 2015/0163202 | A1* | 6/2015 | Nair | H04L 9/0861 726/2 |
| 2015/0200958 | A1* | 7/2015 | Muppidi | H04L 41/28 726/23 |
| 2015/0227756 | A1* | 8/2015 | Barbas | G06F 21/6227 707/783 |
| 2015/0269028 | A1* | 9/2015 | Horn | H04W 12/04 714/4.1 |
| 2015/0347770 | A1* | 12/2015 | Whalley | G06F 21/6245 726/30 |
| 2015/0358356 | A1* | 12/2015 | Diaz-Tellez | H04L 63/20 726/1 |
| 2015/0379293 | A1* | 12/2015 | Wang | G06F 21/6218 726/7 |
| 2016/0119379 | A1* | 4/2016 | Nadkarni | H04L 63/145 726/1 |
| 2016/0134634 | A1* | 5/2016 | Rosendal | H04L 63/08 726/4 |
| 2016/0197947 | A1* | 7/2016 | Im | H04L 63/1425 726/23 |
| 2016/0197948 | A1* | 7/2016 | Im | H04L 63/1425 726/23 |
| 2016/0253509 | A1* | 9/2016 | Wibran | G06F 21/6209 |
| 2016/0269374 | A1* | 9/2016 | Smith | H04L 63/065 |
| 2016/0285911 | A1* | 9/2016 | Goldman | G06F 21/31 |
| 2016/0292444 | A1* | 10/2016 | Shaw | G06F 21/10 |
| 2016/0306719 | A1* | 10/2016 | Laicher | G06F 11/203 |

* cited by examiner

PRIORITIZATION OF USERS DURING DISASTER RECOVERY

BACKGROUND OF THE INVENTION

The present invention relates generally to the field of disaster recovery and more particularly to the prioritization of users during disaster recovery.

Disaster recovery involves a set of policies and procedures to enable the recovery or continuation of vital technology infrastructure and systems following a natural or human-induced disaster. Disaster recovery focuses on information technology or technology systems supporting critical business functions, as opposed to business continuity, which involves keeping all essential aspects of a business functioning despite significant disruptive events. Disaster recovery is therefore a subset of business continuity.

SUMMARY

Embodiments of the present invention include a method, computer program product, and system for the prioritization of users during disaster recovery. In one embodiment, two or more users of a system are determined. The system includes at least one resource. Contextual information for a user of the two or more users is determined. The user of the two or more users are assigned to a tier of a plurality of tiers based on the contextual information. A failure of a system is determined. Responsive to determining the system has a system failure, a user of the two or more users is granted access to the system based on the tier assigned to the user.

DETAILED DESCRIPTION

Figure 1:
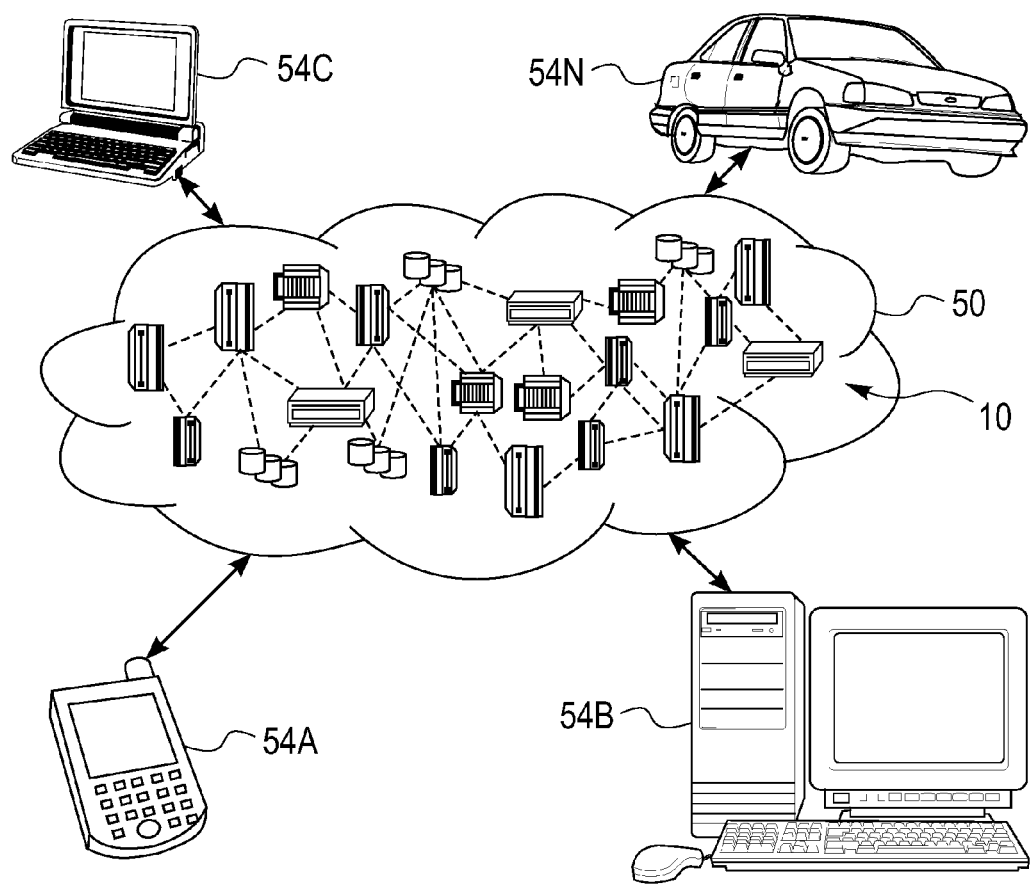
FIG. 1 depicts a cloud computing environment according to an embodiment of the present invention.

Embodiments of the present invention recognize that the growing number of cloud-based applications with a large quantity of users may experience post-disaster performance problems, due to the large quantity of users attempting to access the system/application once disaster recovery is underway. Advantages of some embodiments of the invention include: (i) limiting the quantity of, and functionality of some, users in order to maintain optimal performance for critical users to first access the system or application, (ii) maximization of business recovery, (iii) improved stability, and (iv) granting access to the disaster recovery based on ranking.

The present invention will now be described in detail with reference to the Figures.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
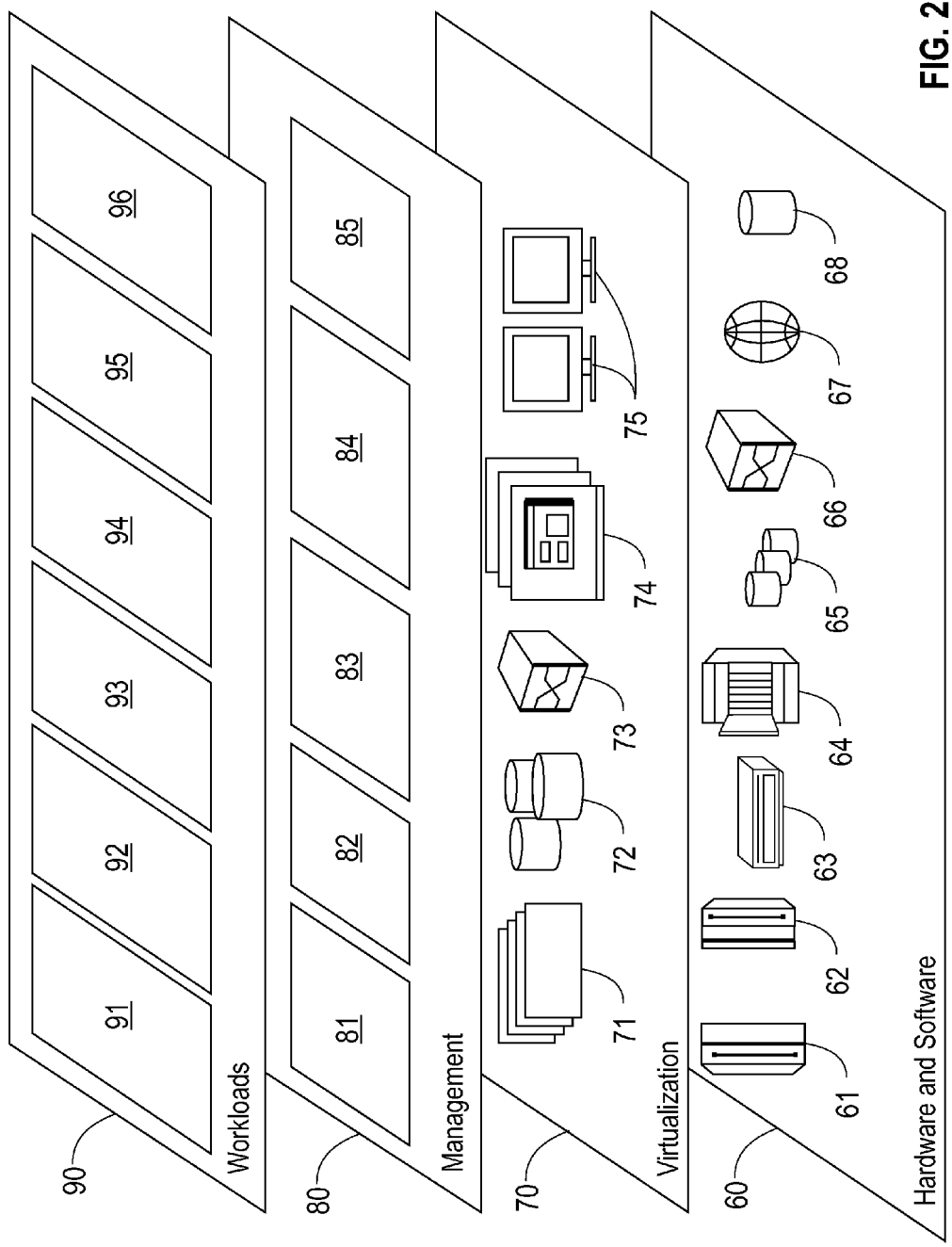
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and disaster recovery 96.

Figure 3:
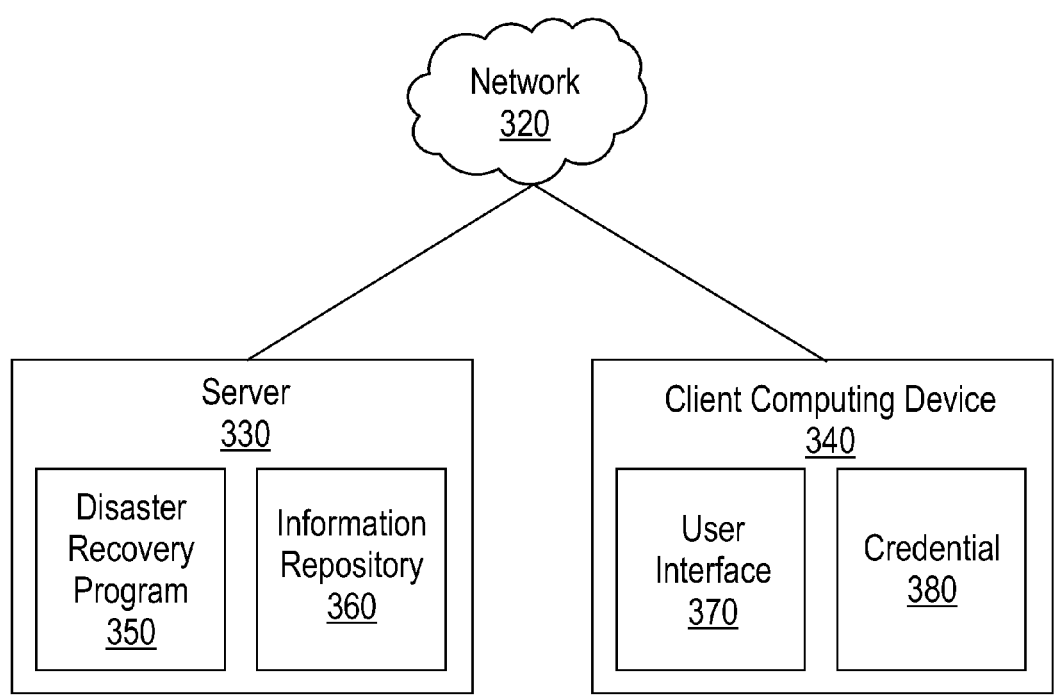
FIG. 3 is a functional block diagram illustrating a computing environment, in accordance with an embodiment of the present invention.

FIG. 3 depicts a diagram of computing environment 300 in accordance with one embodiment of the present invention. FIG. 3 provides an illustration of one embodiment and does not imply any limitations with regard to the environments in which different embodiments may be implemented.

In the depicted embodiment, computing environment 300 includes server 330 and client computing device 340 interconnected over network 320. Network 320 may be a local area network (LAN), a wide area network (WAN) such as the Internet, any combination thereof, or any combination of connections and protocols that will support communications between server 330 and client computing device 340 in accordance with embodiments of the present invention. Network 320 may include wired, wireless, or fiber optic connections. Computing environment 300 may include additional computing devices, servers, or other devices not shown.

Server 330 may be a management server, a web server, or any other electronic device or computing environment capable of processing computer readable program instructions, and receiving and sending data. In other embodiments, server 330 may be a laptop computer, tablet computer, personal computer (PC), a desktop computer, or any programmable electronic device capable of communicating with client computing device 340 via network 320. In other embodiments, server 330 may represent a server computing environment utilizing multiple computers as a server system, such as in a cloud computing environment. In another embodiment, server 330 represents a computing environment utilizing clustered computers and components to act as a single pool of seamless resources. In one embodiment, server 330 contains disaster recovery program 350 and information repository 360. Server 330 may include components as depicted and described in detail with respect to cloud computing node 10, as described in reference to FIG. 1, in accordance with an embodiment of the present invention. Server 330 may include components as depicted and described in further detail with respect to FIG. 5.

In an embodiment, disaster recovery program 350 operates to selectively allow users access to a system or application. In an embodiment, the system or program may be provided by cloud computing environment 50. During disaster recovery, disaster recovery program 350 selectively grants users access to a system or application to provide increased performance for a limited number of people. In another embodiment, disaster recovery program 350 selectively grants user access to a system or application during the operation of disaster recovery activities. In an embodiment, disaster recovery program 350 assigns users to ranked tiers. The higher a tier is ranked, the greater the priority the users in the tier have to the application or system. In an embodiment, as resources become available, disaster recovery program 350 grants more users access to the system or application based on the tier the user is assigned to. In an alternative embodiment, during disaster recovery, disaster recovery program 350 selectively grants users access to a system or application to allow maximum performance for a limited number of critical people first.

In an embodiment, information repository 360 is a repository that may be written to and/or read by disaster recovery program 350. In an embodiment, information repository 360 stores data such as, but not limited to, the location of client computing device 340, the network the user is using to access the system or application, the credential 380 of the user, the type of device the user is using, and the tier the user was assigned to. In an embodiment, information repository 360 stores backup data of the application or system. For example, the backup data is a copy of the system or application, which is used after a failover during disaster recovery. In an embodiment, information repository 360 stores information such as, but not limited to, the role and responsibilities of the user and the current activities of the user as a backup. In some embodiments, information repository 360 resides on server 330. In other embodiments, information repository 360 may reside on another server, or another computing device, provided that information repository 360 is accessible to disaster recovery program 350.

Information repository 360 may be implemented using any volatile or non-volatile storage media for storing information, as known in the art. For example, information repository 360 may be implemented with a tape library, optical library, one or more independent hard disk drives, or multiple hard disk drives in a redundant array of independent disks (RAID). Similarly, information repository 360 may be implemented with any suitable storage architecture known in the art, such as a relational database, an object-oriented database, or one or more tables.

Client computing device 340 may be a desktop computer, laptop computer, tablet computer, personal digital assistant (PDA), or smart phone. In general, client computing device 340 may be any electronic device or computing system capable of executing computer readable program instructions, and communicating with server 330 over network 320. In an embodiment, client computing device 340 contains UI 370 and credential 380. Client computing device 340 may include components as depicted and described in detail with respect to cloud computing node 10, as described in reference to FIG. 1, in accordance with embodiment of the present invention. Client computing device 340 may include components as depicted and described in further detail with respect to FIG. 5.

User interface (UI) 370 operates on client computing device 340 to visualize content, such as menus and icons, and to allow a user to interact with an application accessible to client computing device 340. In one embodiment, UI 370 comprises an interface to disaster recovery program 350. UI 370 may display data received from disaster recovery program 350 and send input received from a user of client computing device 340 to disaster recovery program 350. In other embodiments, UI 370 may comprise one or more interfaces such as, an operating system interface and/or application interfaces. In example embodiments, a user (through input via UI 370) of client computing device 340 communicates with disaster recovery program 350.

A user interface, as shown by UI 370, is a program that provides an interface between a user and an application. A user interface refers to the information (such as graphic, text, and sound) a program presents to a user and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. The actions in GUIs are often performed through direct manipulation of the graphics elements. For example, client application may be a web browser, a database program, etc.

Credential 380 is a unique identifier that is associated with a user. Credential 380 includes contextual information about a user, such as, but not limited to, the name of the user, the role of the user, the tier of the user, and the device the user is accessing the system or application with. Disaster recovery program 350 receives contextual information about the user from credential 380. For example, credential 380 functions as a token that identifies the user and includes user associated contextual information, such as a MAC address of the device the user is using. In an embodiment, based on the contextual information received from credential 380, disaster recovery program 350 determines which tier to assign to the user. In another embodiment, credential 380 includes the tier an administrator assigned to the user. In an embodiment, credential 380 allows users access to the system or application based on the contextual information provided by credential 380. In an embodiment, disaster recovery program 350 actively monitors credential 380 for changes to user contextual information that would change the tier or level of access the user would have to the system or application. For example, if the status of the user changed from a non-administrative role to an administrative role, disaster recovery program 350 would detect the status change in the contextual information of the user, assigning the user to a tier based on the updated contextual information. In some embodiments, credential 380 resides on client computing device 340. In other embodiments, credential 380 may reside on another server, or another computing device, provided that credential 380 is accessible to disaster recovery program 350.

Figure 4:
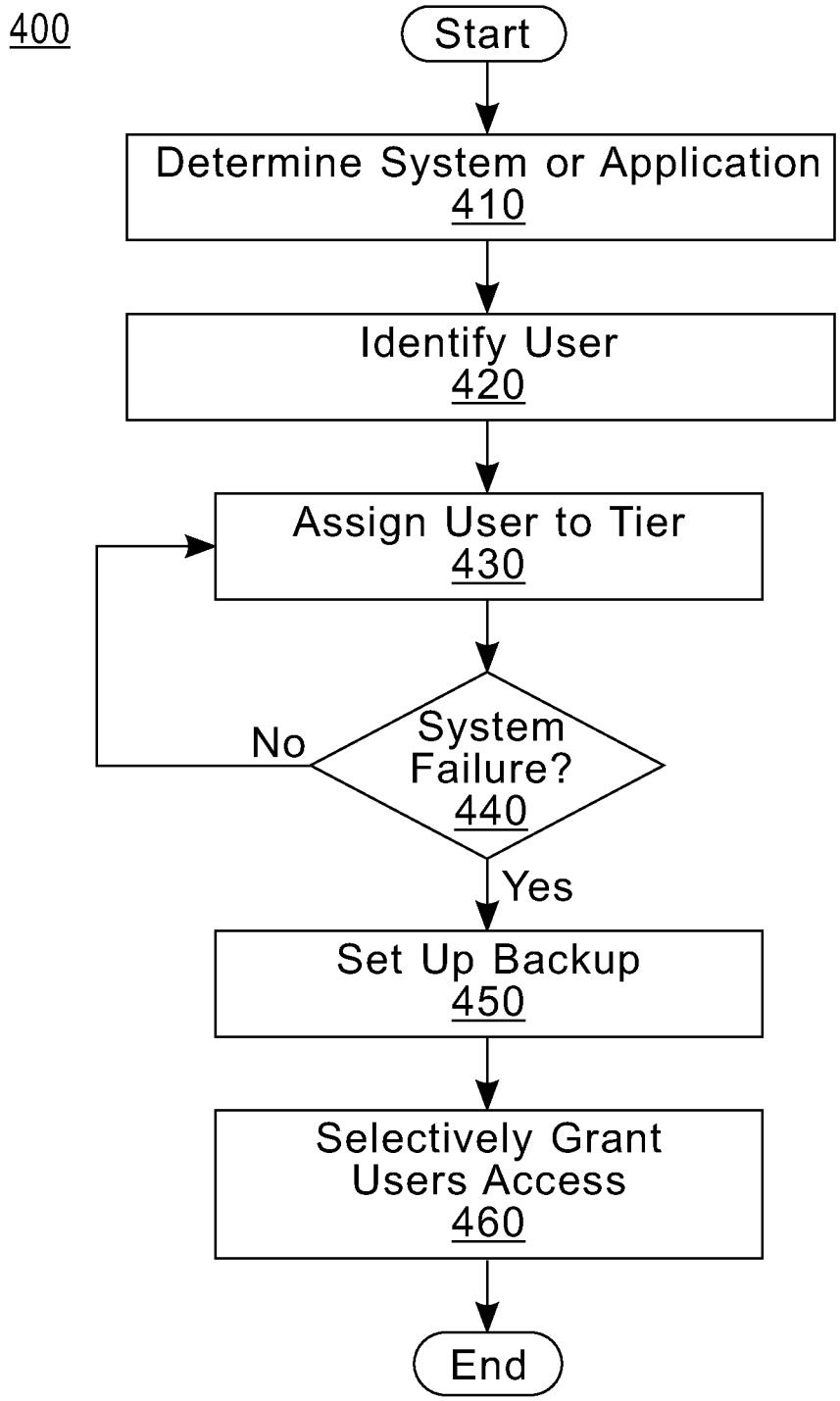
FIG. 4 depicts a flowchart of operational steps of a disaster recovery program selectively granting users access to a system or application during disaster recovery.

FIG. 4 depicts a flowchart of operational steps 400 of disaster recovery program 350 executing within the computing environment of FIG. 3, in accordance with an embodiment of the present invention. Disaster recovery program 350 operates to selectively allow users to gain access to a system or application following disaster recovery. In an embodiment, the steps of the workflow are performed by disaster recovery program 350. Alternatively, steps of the workflow can be performed by any other program while working with disaster recovery program 350.

In an embodiment, a user of client computing device 340, via UI 370, accesses a system or application (not shown). Upon accessing the system or application, disaster recovery program 350 collects contextual information about the user. The contextual information includes, but is not limited to, the device the user is using to access the application or system, the role of the user, and the location the user is accessing the application or system from, as discussed previously. Disaster recovery program 350 collects contextual information with unique identifiers such as, but not limited to, the internet protocol address (IP address) of the user, the media access control address (MAC address) of a user, and a unique user identification (ID) (e.g., username) assigned to a specific user. In an embodiment, the contextual information is stored in credential 380, discussed previously. Disaster recovery program 350 uses the contextual information to assign the user to ranked tiers. When a system or application fails, disaster recovery program 350 selectively allows users to access the system or application during disaster recovery based on the assigned tier of the user and the amount of resources available following disaster recovery.

In step 410, disaster recovery program 350 determines the system or application. In an embodiment, disaster recovery program 350 determines the system or application by accessing the metadata of the system. For example, disaster recovery program 350 determines the system or application is a business ledger based on the metadata provided to disaster recovery program 350 when the business ledger opened and was detected by disaster recovery program 350. In an embodiment, disaster recovery program 350 determines the type of application or system by looking at the type of functions the application or system has. For example, the user is performing an important business ledger operation on the primary system. Simultaneously, disaster recovery program 350 receives information about the role of the user and the corresponding contextual information and activity. If the primary system goes down, disaster recovery program 350 takes appropriate action based on the gathered information.

In an embodiment, disaster recovery program 350 determines a tier to assign to the system or application. For example, disaster recovery program 350 determines a business ledger application is crucial for business function and assigns the business ledger application to the highest, ranked tier. In an embodiment, disaster recovery program 350 determines and ranks functions and capabilities of an application or system. For example, disaster recovery program 350 ranks functions of a business ledger that are more critical to business function in more highly ranked tiers. Whereas disaster recovery program 350 ranks functions less important to business function in lower ranked tiers. For example, disaster recovery program 350 ranks the ability to edit the business ledger in a higher tier than a function that allows a user to view the ledger without the ability to edit the ledger. In an embodiment, disaster recovery program 350 ranks systems, applications, or functions on systems or applications to selectively allow users access to functions, systems, applications. For example, disaster recovery program 350 receives input from a system administrator to make systems, applications, or functions within certain tier accessible to users during disaster recovery.

In step 420, disaster recovery program 350 identifies the user. In an embodiment, disaster recovery program 350 identifies the user by gathering contextual information about the user. The contextual information about the user includes, but is not limited to, the role of the user (e.g., system administrator), the credentials of the user (e.g., user ID or username), the type of device the user is using to access the system or application (e.g., laptop, desktop, mobile phone, or tablet), the location of the user while accessing the system or application (e.g., on site at the location of the business or at home), and the level of data access the user has to the application or system (e.g., system administrator). In an embodiment, disaster recovery program 350 uses the contextual information to identify the user and to assign the user to a tier (as explained in step 430). For example, a unique user ID is associated with contextual info, such as, but not limited to, the device of the user, the role of the user, and the location of the user.

In an embodiment, disaster recovery program 350 identifies the level of access to data the user has to an application or system. For example, the system administrator is assigned a higher level of access to the business ledger than a user who is not directly involved with the business ledger. The higher level of access to the business ledger allows the system administrator to edit the business ledger. Whereas the user not directly involved with the business ledger does not receive access to functions of the business ledger that would allow the user to edit the business ledger. In an embodiment, the level of access is pre-determined (e.g., by a system administrator). In another embodiment, disaster recovery program 350 determines the level of access the user will have. For example, based on credential 380, disaster recovery program 350 identifies system administrators as users that need a higher level of access to the data of a system or application.

In an embodiment, disaster recovery program 350 identifies the user as a static user or a dynamic user. Static users are assigned to a tier long-term, periodically reviewed for changes to the contextual information of the user. In an embodiment, disaster recovery program 350 periodically reviews credential 380 of static users for changes to the status or contextual information of the static user that would place the static user into a different ranked tier. For example, the status of a static user changes from a non-system administrator to a system administrator. Upon reviewing credential 380, disaster recovery program 350 assigns the static user to a more highly ranked tier since the static user changed to a role that is more critical to business function. In an embodiment, disaster recovery program 350 reviews credential 380 of the static user in set intervals (e.g., once a week or once a day). In another embodiment, disaster recovery program 350 uses "tagged" elements to monitor dynamic users and designate dynamic users to a tier. In an embodiment, the tagged element may include, but not limited to, the operation that the user was performing, the role of the user (e.g. job role), and geographical information (e.g., headquarter staff versus non-headquarter staff). Dynamic users are actively monitored in real-time by disaster recovery program 350.

In step 430, disaster recovery program 350 assigns the user to a tier. In an embodiment, disaster recovery program 350 assigns the user to a ranked tier. The higher the tier is ranked, the greater the priority the tier has to access the system or application during disaster recovery. For example, users in a highly ranked tier are given priority to access the application or system than users in lower ranked tiers. Therefore, the users in the more highly ranked tier gain access to the application or system before the users in the lower ranked tier. In an embodiment, disaster recovery program 350 receives input from a user (e.g., system administrator) about which tier another user is to be assigned to. In another embodiment, disaster recovery program 350 determines which tier to assign the user based on the contextual information that disaster recovery program 350 receives from credential 380. In other embodiments, disaster recovery program 350 has a default setting to assign the user to based on selected criteria. For example, disaster recovery program 350 has a default setting to assign the users to ranked tiers based on the role of the user, using a rule set that specifies which user roles belong to which tier.

In an embodiment, disaster recovery program 350 assigns the user to a ranked tier based on the role of a user. For example, the more critical the role of a user is to business function (e.g., an administrator), the higher the ranked tier the user is assigned to. In an embodiment, disaster recovery program 350 assigns users to tiers based on the location of the user. For example, users located on site at the business are assigned to higher ranked tiers than users accessing the system or application off-site. In an embodiment, disaster recovery program 350 assigns users to tiers based on the device of the user. For example, if two users have the same ranking in all categories except for the type of device the users are using, the device that utilizes less resources (e.g., tablet) is ranked higher than a device that utilizes more resources (e.g., desktop computer).

In an embodiment, disaster recovery program 350 determines which tier to assign the user to based on the level of access the user has to system or application data. For example, the greater the access the user has to the data, the higher the tier disaster recovery program 350 assigns the user to.

In an embodiment, disaster recovery program 350 defines or receives input from a user to define the types of devices each tier is allowed to use to access the system or application. For example, disaster recovery program 350 restricts a particular tier to laptops and other mobile devices since they have a greater bandwidth and less latency, reducing the load on the backup system.

In an embodiment, disaster recovery program 350 may use a combination of two or more factors to determine an overall tier the user should be assigned to. For example, disaster recovery program 350 assigns the user to a tier based on the role, location, and/or device of the user. In an embodiment, disaster recovery program 350 ranks groups of users and assigns each group to a tier. For example, a group of administrators are assigned to a tier with the highest level of priority. In an embodiment, disaster recovery program 350 defines a level of access. The ranked tier of a user determines the level of access a user has to the system or application. For example, users in the highest ranked tier have the most access to the system or application than users in a lower tier. In an embodiment, a user such as an administrator can determine the level of access for each tier of users. In another embodiment, disaster recovery program 350 has a default setting to determine the level of access to assign each tier. In other embodiments, disaster recovery program 350 uses an algorithm calculation to determine the level of access to assign each tier of users.

In decision block 440, disaster recovery program 350 determines if a system failure has occurred. In an embodiment, disaster recovery program 350 determines if a system failure has occurred by an alert from another program or from notification disaster recovery program 350 receives from the user. For example, disaster recovery program 350 receives an alert from a program that actively monitors the system, application, and/or device of the user. In another example, a helpdesk user notifies disaster recovery program 350 of a system or application failure. In an embodiment, the monitoring program is within the system, application, and/or device. In another embodiment, the monitoring program is external of the system, application, and/or device. If disaster recovery program 350 determines a system failure has not occurred (decision block 440, no branch), disaster recovery program 350 continues to monitor credential 380 and determines the tier of the user (step 430). In an embodiment, disaster recovery program 350 periodically updates the tier of the user and the level of access to grant the user based on the contextual information disaster recovery program 350 collects about a user, as previously described.

If disaster recovery program 350 determines a system failure occurred (decision block 440, yes branch), disaster recovery program 350 sets up a backup (step 450). In an embodiment, disaster recovery program 350 sets up a backup from a backup stored to information repository 360. In another embodiment, disaster recovery program 350 sets up a backup from another computer device that has access to disaster recovery program 350. In an embodiment, the backup includes some functions of the application or system, allowing the user to access most functions. In another embodiment, the backup only includes the most critical functions for business function. In an embodiment, disaster recovery program 350 copies active data from the production system to the failover system.

In step 460, disaster recovery program 350 selectively grants the user access to the system or application. In an embodiment, disaster recovery program 350 selectively grants the user access to the system or application based on the ranked, assigned tier of the user. For example, disaster recovery program 350 initially grants users within the highest ranked tier with access to the system or application. In an embodiment, as more resources become available, disaster recovery program 350 grants access to more users from lower ranked tiers. For example, when more resources become available to accommodate the next tier of users, disaster recovery program 350 grants users from the second highest ranked tier with access to the system or application and continues this process with lower ranked tiers until all tiers have access to the system or application or when the system or application resumes normal function. In another embodiment, disaster recovery program 350 grants access to the system or application as services stabilize. In an embodiment, disaster recovery program 350 only grants critical users (e.g., system administrators) with access to the system or application. In an embodiment, disaster recovery program 350 actively monitors the system or application backup to determine if the next tier of users can be added to the system or application. In an embodiment, disaster recovery program 350 grants the user with access to certain functions, based on contextual information provided credential 380 of the user.

In an alternate embodiment, disaster recovery program 350 grants users access to the system or application incrementally. For example, at the top of every hour, disaster recovery program 350 grants the next tier of users access to the system or application. In alternate embodiment, disaster recovery program 350 receives input from a user (e.g., system administrator) to enable disaster recovery and only allow tiers selected by the user to have access to the system or application. For example, during normal operation, a system administrator wants to limit access to the system or application. Disaster recovery program 350 receives input from the system administrator to activate disaster recovery so that only the top two tiers can receive access to the system or application. Processing ends when the system or application is fully restored to its normal capacity prior to the system or application failure or when disaster recovery program 350 receives from a user to restore normal operating functions.

Figure 5:
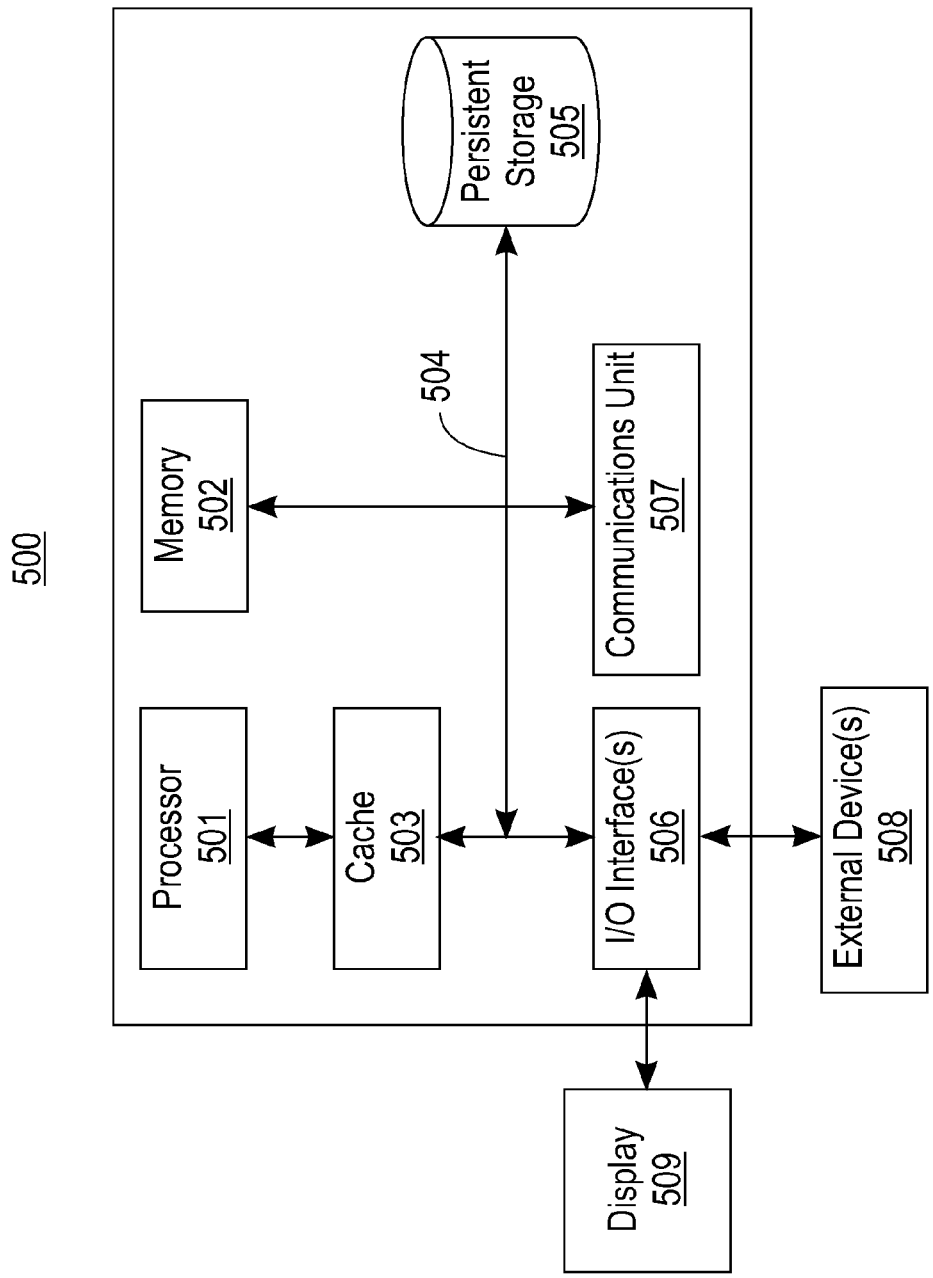
FIG. 5 depicts a block diagram of components of the computing device of FIG. 3, in accordance with an embodiment of the present invention.

FIG. 5 depicts computer system 500, that is an example of a system that includes disaster recovery program 350. Processors 501 and cache 503 are substantially equivalent to. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for the prioritization of users during disaster recovery, the method comprising:
    determining, by one or more computer processors, two or more users of a system, wherein the system includes at least one resource;
    determining, by one or more computer processors, contextual information for each user of the two or more users;
    assigning, by one or more computer processors, each user of the two or more users to any tier of a plurality of tiers based on the contextual information associated with each user of the two or more users;
    determining, by one or more computer processors, a failure of the system;
    in response to determining the failure, receiving, by one or more computer processors, a request from a first user of the two or more users, wherein the request is for the first user to access the system; and
    in response to receiving the request from the first user, granting, by one or more computer processors, access to the system for the first user based on the tier assigned to the user.

2. The method of claim 1, wherein the contextual information includes one or more of the following: a name of a user, a role of the user, a pre-assigned tier of the user, a device the user is accessing the system, an internet protocol address (IP address) of the device of the user, a unique user identification associated with the user, a level of access of data that the user has to the system.

3. The method of claim 1, further comprising:
    receiving, by one or more computer processors, an update to the at least one resource; and
    responsive to receiving the update to the at least one resource, granting, by one or more processors, access to the user of the two or more users based on the assigned tiers and the updated at least one resource.

4. The method of claim 1, further comprising:
    receiving, by one or more computer processors, an update to the contextual information; and
    responsive to receiving the update to the contextual information, assigning, by one or more computer processors, the user of the two or more users to a tier of the plurality of tiers based on the updated contextual information.

5. The method of claim 4, wherein the user of the two or more users is one of the following: a static user or a dynamic user.

6. The method of claim 5, wherein the contextual information of the dynamic user is updated in real-time.

7. The method of claim 5, wherein the contextual information of the static user is updated in a set time interval.

8. A computer program product for the prioritization of users during disaster recovery, the computer program product comprising:
    one or more computer readable storage devices; and
    program instructions stored on the one or more computer readable storage devices, the program instructions comprising:
        program instructions to determine two or more users of a system, wherein the system includes at least one resource;

program instructions to determine contextual information for each user of the two or more users;
program instructions to assign each user of the two or more users to any tier of a plurality of tiers based on the contextual information associated with each user of the two or more users;
program instructions to determine a failure of the system;
in response to determining the failure, program instructions to receive a request from a first user of the two or more users, wherein the request is for the first user to access the system; and
in response to receiving the request from the first user, program instructions to grant access to the system for the first user based on the tier assigned to the user.

9. The computer program product of claim 8, wherein the contextual information includes one or more of the following: a name of a user, a role of the user, a pre-assigned tier of the user, a device the user is accessing the system, an internet protocol address (IP address) of the device of the user, a unique user identification associated with the user, a level of access of data that the user has to the system.

10. The computer program product of claim 8, further comprising program instructions, stored on the one or more computer readable storage devices, to:
receive an update to the at least one resource; and
responsive to receiving the update to the at least one resource, grant access to two or more users based on the assigned tiers and the updated at least one resource.

11. The computer program product of claim 8, further comprising program instructions, stored on the one or more computer readable storage devices, to:
receive an update to the contextual information; and
responsive to receiving the update to the contextual information, assign the user of the two or more users to a tier of the plurality of tiers based on the updated contextual information.

12. The computer program product of claim 11, wherein the user of the two or more users is one of the following: a static user or a dynamic user.

13. The computer program product of claim 12, wherein the contextual information of the dynamic user is updated in real-time.

14. The computer program product of claim 12, wherein the contextual information of the static user is updated in a set time interval.

15. A computer system for the prioritization of users during disaster recovery, the computer system comprising:
one or more computer processors;
one or more computer readable storage media; and
program instructions, stored on the computer readable storage media for execution by at least one of the one or more processors, the program instructions comprising:
program instructions to determine two or more users of a system, wherein the system includes at least one resource;
program instructions to determine contextual information for each user of the two or more users;
program instructions to assign each user of the two or more users to any tier of a plurality of tiers based on the contextual information associated with each user of the two or more users;
program instructions to determine a failure of the system;
in response to determining the failure, program instructions to receive a request from a first user of the two or more users, wherein the request is for the first user to access the system; and
in response to receiving the request from the first user, program instructions to grant access to the system for the first user based on the tier assigned to the user.

16. The computer system of claim 15, wherein the contextual information includes one or more of the following: a name of a user, a role of the user, a pre-assigned tier of the user, a device the user is accessing the system, an internet protocol address (IP address) of the device of the user, a unique user identification associated with the user, a level of access of data that the user has to the system.

17. The computer system of claim 15, further comprising program instructions, stored on the computer readable storage media for execution by at least one of the one or more processors, to:
receive an update to the at least one resource; and
responsive to receiving the update to the at least one resource, grant access to two or more users based on the assigned tiers and the updated at least one resource.

18. The computer system of claim 15, further comprising program instructions, stored on the computer readable storage media for execution by at least one of the one or more processors, to:
receive an update to the contextual information; and
responsive to receiving the update to the contextual information, assign the user of the two or more users to a tier of the plurality of tiers based on the updated contextual information.

19. The computer system of claim 18, wherein the user of the two or more users is one of the following: a static user or a dynamic user.

20. The computer system of claim 19, wherein the contextual information of the dynamic user is updated in real-time.

* * * * *